(12) United States Patent
Baker

(10) Patent No.: US 11,872,792 B2
(45) Date of Patent: Jan. 16, 2024

(54) COMPOSITE CORE WITH REINFORCED AREAS AND METHOD

(71) Applicant: Wabash National, L.P., Lafayette, IN (US)

(72) Inventor: Leonard W. Baker, Lafayette, IN (US)

(73) Assignee: Wabash National, L.P., Lafayette, IN (US)

(*) Notice: Subject to any disclaimer, the term of this patent is extended or adjusted under 35 U.S.C. 154(b) by 818 days.

(21) Appl. No.: 16/482,204

(22) PCT Filed: Jan. 30, 2018

(86) PCT No.: PCT/US2018/015984
§ 371 (c)(1),
(2) Date: Jul. 30, 2019

(87) PCT Pub. No.: WO2018/140955
PCT Pub. Date: Aug. 2, 2018

(65) Prior Publication Data
US 2020/0223204 A1 Jul. 16, 2020

Related U.S. Application Data

(60) Provisional application No. 62/451,930, filed on Jan. 30, 2017.

(51) Int. Cl.
*B32B 3/24* (2006.01)
*B32B 37/14* (2006.01)
(Continued)

(52) U.S. Cl.
CPC ............. *B32B 37/144* (2013.01); *B32B 3/06* (2013.01); *B32B 3/08* (2013.01); *B32B 3/12* (2013.01);
(Continued)

(58) Field of Classification Search
CPC .................. B32B 3/12; B32B 3/266
(Continued)

(56) References Cited

U.S. PATENT DOCUMENTS 2,294,930 A  9/1942  Palmquist
2,719,809 A  10/1955  Herts
(Continued)

FOREIGN PATENT DOCUMENTS

CA       2165016 A1    6/1996
DE  102008020976 A1   10/2009
(Continued)

OTHER PUBLICATIONS

Extended European Search Report, in related EU Application No. 18 744 152.2, dated Jul. 20, 2020, 5 pages.
(Continued)

*Primary Examiner* — William P Watkins, III
(74) *Attorney, Agent, or Firm* — Quarles & Brady LLP

(57) ABSTRACT

A method of producing a composite core member along a production line is disclosed. The core member is designed to be used within a composite panel of a tractor trailer. The method comprises the steps of providing an intermediate core member comprising a reinforced material positioned on at least one end of the intermediate core member and producing at least two strips of reinforced material. The intermediate core member is inserted between the strips of reinforced material and the strips of reinforced material are coupled to a first side and a second side of the intermediate core member to form the core member.

20 Claims, 11 Drawing Sheets

(51) Int. Cl.
    *B32B 3/06*                (2006.01)
    *B32B 3/08*                (2006.01)
    *B32B 3/12*                (2006.01)
    *B32B 3/28*                (2006.01)
    *B32B 15/085*             (2006.01)
    *B32B 15/09*              (2006.01)
    *C08J 9/40*                (2006.01)
    *B32B 37/15*              (2006.01)
    *B32B 3/26*                (2006.01)
    *B32B 7/12*                (2006.01)

(52) U.S. Cl.
    CPC .............. *B32B 3/28* (2013.01); *B32B 15/085* (2013.01); *B32B 15/09* (2013.01); *B32B 37/146* (2013.01); *B32B 37/153* (2013.01); *C08J 9/405* (2013.01); *B32B 3/266* (2013.01); *B32B 7/12* (2013.01); *B32B 2605/00* (2013.01); *Y10T 428/249953* (2015.04)

(58) Field of Classification Search
    USPC ........................................................ 428/117
    See application file for complete search history.

(56) References Cited

U.S. PATENT DOCUMENTS

| | | | |
|---|---|---|---|
| 2,934,372 A | 4/1960 | Jewell | |
| 3,072,225 A | 1/1963 | Cremer | |
| 3,249,659 A | 5/1966 | Voelker | |
| 3,420,023 A | 1/1969 | Gregori | |
| 3,515,615 A | 6/1970 | Okada | |
| 3,617,351 A | 11/1971 | Long | |
| 3,817,671 A | 6/1974 | Lemelson | |
| 4,128,369 A | 12/1978 | Kemerer et al. | |
| 4,336,294 A * | 6/1982 | Meier | A47B 13/083 156/45 |
| 4,340,129 A | 7/1982 | Salyers | |
| 4,557,100 A | 12/1985 | Gorges | |
| 4,578,297 A | 3/1986 | Duncan | |
| 4,701,369 A | 10/1987 | Duncan | |
| 4,708,757 A | 11/1987 | Guthrie | |
| 4,709,781 A | 12/1987 | Scherzer | |
| 4,783,287 A | 11/1988 | Eichberger et al. | |
| 4,796,397 A | 1/1989 | Capaul | |
| 4,817,264 A | 4/1989 | Worthing | |
| 4,879,152 A | 11/1989 | Green | |
| 4,930,266 A | 6/1990 | Calhoun et al. | |
| 4,940,279 A | 7/1990 | Abott et al. | |
| 5,042,395 A | 8/1991 | Wackerle et al. | |
| 5,066,531 A | 11/1991 | Legg et al. | |
| 5,186,996 A | 2/1993 | Alts | |
| 5,214,991 A | 6/1993 | Shimizu et al. | |
| 5,275,848 A | 1/1994 | Mito et al. | |
| 5,328,744 A | 7/1994 | Kaufmann et al. | |
| 5,507,405 A | 4/1996 | Thomas et al. | |
| 5,554,246 A | 9/1996 | Anwyll, Jr. | |
| 5,580,636 A | 12/1996 | Kampmann et al. | |
| 5,604,021 A | 2/1997 | Wagner | |
| 5,698,153 A | 12/1997 | Hoopingarner et al. | |
| 5,698,308 A | 12/1997 | Sumiya et al. | |
| 5,702,798 A | 12/1997 | Sugita et al. | |
| 5,718,965 A | 2/1998 | Shiroeda et al. | |
| 5,774,972 A | 7/1998 | Ehrlich | |
| 5,779,847 A | 7/1998 | Groeger | |
| 5,851,342 A | 12/1998 | Vydra et al. | |
| 5,860,693 A | 1/1999 | Ehrlich | |
| 5,899,037 A | 5/1999 | Josey | |
| 5,919,545 A | 7/1999 | Giezendanner et al. | |
| 5,979,684 A | 11/1999 | Ohnishi et al. | |
| 5,997,076 A | 12/1999 | Ehrlich | |
| 6,007,890 A | 12/1999 | DeBlander | |
| 6,080,495 A | 6/2000 | Wright | |
| 6,199,939 B1 | 3/2001 | Ehrlich | |
| 6,220,651 B1 | 4/2001 | Ehrlich | |
| 6,266,865 B1 | 7/2001 | Ehrlich | |
| 6,276,748 B1 | 8/2001 | Gobessi et al. | |
| 6,355,302 B1 | 3/2002 | Vandenberg et al. | |
| 6,368,721 B1 | 4/2002 | Watanabe et al. | |
| 6,383,559 B1 | 5/2002 | Nakamura et al. | |
| 6,412,854 B2 | 7/2002 | Ehrlich | |
| 6,537,413 B1 | 3/2003 | Hochet et al. | |
| 6,546,694 B2 | 4/2003 | Clifford | |
| 6,635,202 B1 | 10/2003 | Bugg et al. | |
| 6,638,636 B2 | 10/2003 | Tucker | |
| 6,680,017 B1 | 1/2004 | Koch et al. | |
| RE38,508 E | 4/2004 | Wright | |
| 6,824,851 B1 | 11/2004 | Locher et al. | |
| 6,843,525 B2 | 1/2005 | Preisler | |
| 6,852,386 B2 | 2/2005 | Nadezhdin et al. | |
| 6,866,492 B2 | 3/2005 | Hauber et al. | |
| 6,986,546 B2 | 1/2006 | Ehrlich | |
| 7,014,253 B2 | 3/2006 | Oren | |
| 7,017,981 B2 | 3/2006 | Strohmavr et al. | |
| 7,056,567 B2 | 6/2006 | ONeill et al. | |
| 7,069,702 B2 | 7/2006 | Ehrlich | |
| 7,128,365 B2 | 10/2006 | Kiesewetter et al. | |
| 7,155,797 B2 | 1/2007 | Kim | |
| 7,255,822 B2 | 8/2007 | Bledsoe et al. | |
| 7,338,696 B2 | 3/2008 | Rambaud et al. | |
| 7,540,932 B2 | 6/2009 | Rub et al. | |
| 7,553,435 B2 | 6/2009 | McCollum | |
| 7,722,112 B2 | 5/2010 | Ehrlich | |
| 7,722,122 B2 | 5/2010 | Mittelstadt | |
| 7,758,487 B2 | 7/2010 | Elsayed et al. | |
| 7,785,518 B2 | 8/2010 | Wirt et al. | |
| 7,814,658 B2 | 10/2010 | Akishev et al. | |
| 7,842,147 B2 | 11/2010 | Shen et al. | |
| 8,087,494 B2 | 1/2012 | Palumbo et al. | |
| 8,273,208 B2 | 9/2012 | Brinner | |
| 8,336,933 B2 | 12/2012 | Nagwanshi et al. | |
| 8,474,583 B2 | 7/2013 | Nagwanshi et al. | |
| 8,524,351 B2 | 9/2013 | Ross | |
| 8,584,433 B2 | 11/2013 | Masuda | |
| 8,663,523 B2 | 3/2014 | Bradford et al. | |
| 8,690,233 B2 | 4/2014 | Preisler et al. | |
| 8,726,613 B2 | 5/2014 | Rhee et al. | |
| 8,764,089 B2 | 7/2014 | Preisler et al. | |
| 8,770,344 B2 | 7/2014 | Borroni | |
| 8,795,465 B2 | 8/2014 | Preisler et al. | |
| 8,795,807 B2 | 8/2014 | Preisler et al. | |
| 8,808,827 B2 | 8/2014 | Preisler et al. | |
| 8,808,828 B2 | 8/2014 | Preisler et al. | |
| 8,808,829 B2 | 8/2014 | Preisler et al. | |
| 8,808,830 B2 | 8/2014 | Preisler et al. | |
| 8,808,831 B2 | 8/2014 | Preisler et al. | |
| 8,808,833 B2 | 8/2014 | Preisler et al. | |
| 8,808,834 B2 | 8/2014 | Preisler et al. | |
| 8,808,835 B2 | 8/2014 | Preisler et al. | |
| 8,834,985 B2 | 9/2014 | Preisler et al. | |
| 8,845,947 B2 | 9/2014 | Wirt et al. | |
| 8,852,711 B2 | 10/2014 | Preisler et al. | |
| 8,859,074 B2 | 10/2014 | Preisler et al. | |
| 8,883,285 B2 | 11/2014 | Preisler et al. | |
| 8,945,327 B2 | 2/2015 | Stamp et al. | |
| 8,995,138 B2 | 3/2015 | Preisler et al. | |
| 9,010,834 B2 | 4/2015 | Preisler et al. | |
| 9,126,537 B2 | 9/2015 | Preisler et al. | |
| 9,283,895 B2 | 3/2016 | Sumi et al. | |
| 9,308,945 B2 | 4/2016 | Preisler et al. | |
| RE45,991 E | 5/2016 | Preisler et al. | |
| 9,346,375 B2 | 5/2016 | Preisler et al. | |
| 9,550,336 B2 | 1/2017 | Bradford | |
| 9,908,315 B2 | 3/2018 | Speer | |
| 10,239,566 B2 | 3/2019 | Bauer et al. | |
| 2001/0011832 A1 | 8/2001 | Ehrlich et al. | |
| 2002/0014302 A1 | 2/2002 | Fanucci et al. | |
| 2002/0098341 A1 | 7/2002 | Schiffer et al. | |
| 2002/0109377 A1 | 8/2002 | Ehrlich | |
| 2002/0176960 A1 | 11/2002 | Nadezhdin et al. | |
| 2003/0186029 A1 | 10/2003 | Ogawa et al. | |
| 2004/0055248 A1 | 3/2004 | Grillos | |
| 2004/0217631 A1 | 11/2004 | Ehrlich | |
| 2005/0087899 A1 | 4/2005 | Coon et al. | |

(56) References Cited

U.S. PATENT DOCUMENTS

| | | |
|---|---|---|
| 2005/0123720 A1 | 6/2005 | Suzuki et al. |
| 2005/0204561 A1 | 9/2005 | Kim |
| 2005/0225118 A1 | 10/2005 | Oren |
| 2005/0257893 A1 | 11/2005 | Rub et al. |
| 2006/0028050 A1 | 2/2006 | Ehrlich |
| 2006/0241542 A1 | 10/2006 | Gudnason et al. |
| 2007/0004813 A1 | 1/2007 | Shelby et al. |
| 2007/0056687 A1 | 3/2007 | Brinner |
| 2007/0196681 A1 | 8/2007 | Biggs et al. |
| 2007/0256379 A1 | 11/2007 | Edwards |
| 2008/0111393 A1 | 5/2008 | Ehrlich |
| 2008/0116718 A1 | 5/2008 | Lewallen et al. |
| 2009/0202785 A1 | 8/2009 | Meyer Zu Drewer et al. |
| 2009/0206631 A1 | 8/2009 | Lewallen et al. |
| 2009/0297763 A1 | 12/2009 | Ross |
| 2009/0324905 A1 | 12/2009 | Welch et al. |
| 2010/0227087 A1 | 9/2010 | Naldi |
| 2011/0089183 A1 | 4/2011 | Gundelsheimer |
| 2011/0095574 A1 | 4/2011 | Brown |
| 2011/0135862 A1 | 6/2011 | Sumi et al. |
| 2011/0250384 A1 | 10/2011 | Sumi et al. |
| 2012/0040131 A1* | 2/2012 | Speer .................. B32B 15/18 428/131 |
| 2012/0040135 A1 | 2/2012 | Werthen et al. |
| 2014/0044914 A1 | 2/2014 | Kurtz et al. |
| 2014/0127452 A1 | 5/2014 | Dietz et al. |
| 2014/0178636 A1 | 6/2014 | Wu et al. |
| 2014/0345795 A1 | 11/2014 | Speer |
| 2014/0349077 A1 | 11/2014 | Sumi et al. |
| 2015/0130220 A1 | 5/2015 | Preisler et al. |
| 2015/0130221 A1 | 5/2015 | Preisler et al. |
| 2015/0132532 A1 | 5/2015 | Preisler et al. |
| 2015/0145276 A1 | 5/2015 | Preisler et al. |
| 2015/0273810 A1 | 10/2015 | Carretta |
| 2015/0306840 A1 | 10/2015 | Ferguson, Jr. |
| 2015/0375449 A1* | 12/2015 | Streichardt ......... B32B 38/0012 156/154 |
| 2016/0176149 A1 | 6/2016 | Manderfeld et al. |

FOREIGN PATENT DOCUMENTS

| | | |
|---|---|---|
| EP | 2133184 A1 | 12/2009 |
| GB | 2000465 A | 1/1979 |
| JP | H0387461 A | 4/1991 |
| JP | 2003285397 A | 10/2003 |
| JP | 2005238622 A | 9/2005 |
| WO | 9014943 A1 | 12/1990 |
| WO | 9300845 A1 | 1/1993 |
| WO | 0024559 A1 | 5/2000 |
| WO | 0244493 A1 | 6/2002 |
| WO | 2005077654 A1 | 8/2005 |
| WO | 2006128632 A1 | 12/2006 |
| WO | 2008141688 A2 | 11/2008 |
| WO | 2010050242 A1 | 5/2010 |
| WO | 2010069994 A2 | 6/2010 |

OTHER PUBLICATIONS

Non-Final Rejection dated Sep. 1, 2009, for U.S. Appl. No. 11/859,014, 8 pages; obtained from USPTO records, U.S. Pat. No. 9,908,315.
Non-Final Rejection dated Oct. 1, 2013, for U.S. Appl. No. 13/204,762, 18 pages; obtained from USPTO records, U.S. Pat. No. 9,908,315.
Final Rejection dated Apr. 9, 2014, for U.S. Appl. No. 13/204,762, 17 pages; obtained from USPTO records, U.S. Pat. No. 9,908,315.
International Search Report and Written Opinion issued in corresponding PCT/US2018/018151 dated Apr. 5, 2018, 6 pages.
International Search Report and Written Opinion issued in corresponding PCT/US2018/015984 dated Apr. 19, 2018, 7 pages.

* cited by examiner

COMPOSITE CORE WITH REINFORCED AREAS AND METHOD

CROSS-REFERENCE TO RELATED APPLICATIONS

This application is a U.S. National Stage of PCT Application No. PCT/US2018/015984 filed on Jan. 30, 2018 which claims priority under 35 U.S.C. § 119 to U.S. Provisional Patent Application No. 62/451,930 filed on Jan. 30, 2017, the entire contents of which are incorporated herein by reference.

BACKGROUND

Many storage trailers, including those for commercial trucking, consist of sidewalls and doors constructed from composite materials. Composite materials may have a plastic core disposed between two outer metal sheets. For example, Wabash National Corporation of Lafayette, Ind. makes DURAPLATE® composite panels that have a high-density polyethylene plastic core (HDPE) fastened between two high-strength, high-tension steel plates.

Cores of composite panels may be constructed from a plurality of structures including a network of cells. One such network of cells is made from an arrangement of hexagons that produce a honeycomb structure with alternating geometric structures and air pockets. In some instances, partially hollow cores use less plastic than completely solid cores, cutting down on material costs. Additionally, the partially hollow cores weigh less than completely solid cores and have higher density to strength ratios. However, some cores may lack the strength required for mechanical fastening used in many commercial applications.

SUMMARY

A method of producing a composite core member along a production line is disclosed. The core member is designed to be used within a composite panel of a tractor trailer. The method comprises the steps of providing an intermediate core member comprising a reinforced material positioned on at least one end of the intermediate core member and producing at least two strips of reinforced material. The intermediate core member is inserted between the strips of reinforced material and the strips of reinforced material are coupled to a first side and a second side of the intermediate core member to form the core member.

The method may further comprise a step of providing a partially hollow honeycomb structure as the intermediate core member. The step of providing the partially hollow honeycomb structure further includes the steps of vacuum forming a thermoplastic sheet of material into a plurality of pairs of shapes on a production line, and providing the thermoplastic sheet of material with shapes onto a conveyor belt.

In some embodiments, the conveyor belt operates at a lower speed than a speed of the production line to cause the pairs of shapes to bunch up and form the partially hollow honeycomb structure. The step of providing the intermediate core member further comprises operating the production line in a first state of operation for a first time period to form the partially hollow honeycomb structure and operating the production line in a second state of operation different from the first state of operation to form a gap in the partially hollow honeycomb structure.

The step of providing the intermediate core member further comprises operating the production line for a first time period to form the partially hollow honeycomb structure and operating the production line at an increased speed for a second time period to collapse at least a portion of the partially hollow honeycomb structure. The second state of operation includes the production line being operated for a second time period, wherein the second time period is less than the first time period. A ratio between the first time period and the second time period may range between about 10:1 to about 7:1.

The second state of operation includes the step of interrupting the vacuum forming step. In other embodiments, the second state of operation includes the step of increasing an operating speed of the production line from a normal speed to an accelerated speed.

The method further comprises the steps of providing a gap in the honeycomb structure and inserting the reinforced material into the gap.

The method further comprises a lamination step after the coupling step.

The method further comprises a step of cutting the composite core member to a predetermined length and a predetermined width. The predetermined length is between about 2 meters to about 4 meters and the predetermined width is between about 0.75 meters to about 2 meters.

The method further comprises the steps of fastening a first sheet to a front face of the core member and fastening a second sheet to a rear face of the core member.

The step of providing an intermediate core member is performed on a first production line and the step of producing at least two strips of reinforced material is performed on a second production line separate from the first production line.

The method further comprises a step of guiding the at least two strips of reinforced material toward the intermediate core member.

The step of producing the at least two strips of reinforced material comprises extruding the at least two strips of reinforced material. The at least two strips of reinforced material are extruded with a predetermined gap therebetween.

The step of coupling the at least two strips of reinforced material to the first side and the second side of the intermediate core member comprises thermally welding one of the at least two strips of reinforced material to the first side and the other of the at least two strips to the second side of the intermediate core member.

A method of producing a composite core member along a production line is also disclosed. The core member is used as a core within a composite panel of a tractor trailer. The method comprises the steps of providing a honeycomb core member including a plurality of hollow areas, inserting a filler material within the hollow areas of the honeycomb core member using at least one dispensing device, and solidifying the filler material within the honeycomb core member via a lamination process.

The step of providing the honeycomb core member may also comprise the steps of vacuum forming a thermoplastic sheet of material into a plurality of pairs of shapes on a production line, and providing the thermoplastic sheet of material with shapes onto a conveyor belt. The conveyor belt operates at a lower speed than a speed of the production line to cause the pairs of shapes to bunch up and form the honeycomb core member.

The method further comprises a step of cutting the composite core member to a predetermined length and a predetermined width. The predetermined length is between about 2 meters to about 4 meters and the predetermined width is between about 0.75 meters to about 2 meters.

The method further comprises the steps of fastening a first sheet to a front face of the composite core member and fastening a second sheet to a rear face of the comprise core member.

The step of providing the honeycomb core member is performed on a first production line and the step of inserting the filler material within the hollow areas of the honeycomb core member using at least one dispensing device is performed on a second production line. The filler material is a plastic resin. In some embodiments, the filler material is a carbon dioxide filled plastic resin.

The step of inserting the filler material within the hollow areas of the core member using the dispending device comprises a step of inserting the filler within the hollow areas of the core member that circumscribe a perimeter of the core member.

The method further comprises the step of expanding the filler material.

The step of inserting the filler material within the hollow areas of the honeycomb core member using the dispensing device comprises inserting a first filler material within the hollow areas of the core member and inserting a second filler material within the hollow areas of the core member.

The step of inserting the filler material within the hollow areas of the honeycomb core member comprises partially filling the hollow areas of the honeycomb core member.

A composite panel configured for a use in a sidewall and a door of a tractor trailer is also disclosed. The composite panel includes an outer sheet, an inner sheet, and a core member positioned between the inner sheet and the outer sheet, wherein the core member includes a reinforced material that circumscribes an entirety of a perimeter of the core member.

The outer sheet and the inner sheet comprise a material selected from the group consisting of a metal, a fibre-reinforced plastic, and a glass reinforced plastic.

The core member further comprises a partially hollow structure.

The reinforced material comprises an upper portion, a lower portion, a first side portion, and a second side portion. The upper portion extends outwardly from the partially hollow structure between about 2 centimeter to about 25 centimeters. The lower portion extends outwardly from the partially hollow structure between about 10 centimeters to about 30 centimeters. The first side portion extends outwardly from a left side of the partially hollow structure between about 3 centimeters to about 15 centimeters. The second side portion extends outwardly from a right side of the partially hollow structure between about 3 centimeters to about 15 centimeters. The upper portion, the lower portion, the first side portion, and the second side portion of the reinforced material have the same composition.

The partially hollow structure comprises over about 90% of a volume of the core member.

The partially hollow structure is a honeycomb cell network comprising a plurality of hexagonal cells. The partially hollow structure comprises a material selected from the group consisting of high density polyethylene, high density polypropylene, low density polyethylene, polyethylene terephthalate, polypropylene, and combinations thereof.

The reinforced material comprises a material selected from the group consisting of high density polyethylene, high density polypropylene, low density polyethylene, polyethylene terephthalate, polypropylene.

The composite panel has a length dimension ranging between about 2.5 meters to about 3.5 meters. The composite panel has a width dimension ranging between about 1 meter to about 2 meters.

The partially hollow structure and the reinforced material comprise the same composition, but a different volumetric mass density.

The outer sheet and the inner sheet are bonded to the core member by an adhesive. The adhesive is a modified polyethylene.

The partially hollow structure is thermally welded to the reinforced material.

DETAILED DESCRIPTION

Figure 1:
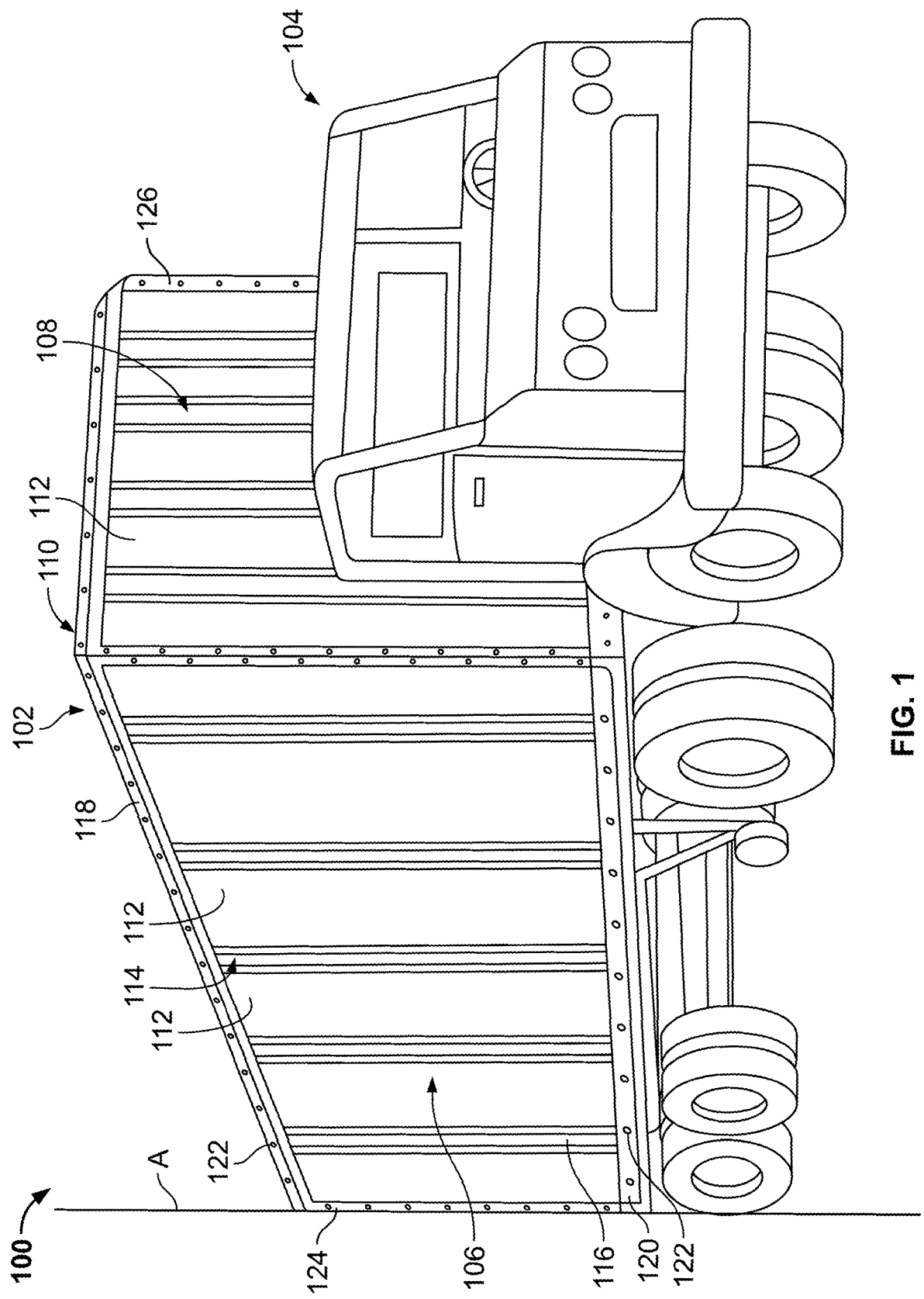
FIG. 1 is a perspective view of a trailer having sidewalls that include a plurality of composite panels.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 depicts a tractor trailer assembly 100 including a trailer 102 designed to carry cargo and a tractor 104 having an engine and a cab section. The trailer 102 may be substantially rectangular and may be defined by one or more sidewalls 106, a front end wall assembly 108, a roof assembly 110, and a rear end wall assembly (not shown), which may include an overhead door. Further, the trailer 102 may be defined by a floor assembly (not depicted) disposed opposite the roof assembly 110. Alternatively, the rear end wall assembly may include two doors mounted in a conventional manner such that the doors are hingedly coupled to and swing between an open position and a closed position. Further, the trailer 102 may be releasably coupled to the tractor 104 by conventional means, such as a fifth wheel, for example.

Portions of each sidewall 106, the front end wall assembly 108, the roof assembly 110, the floor assembly, and/or the rear end wall assembly of the trailer 102 may be made from one or more composite panels 112. The composite panels 112 may be coupled to each other using a number of different fasteners and/or joint configurations. In one embodiment, the composite panels 112 may be coupled to each other via joint configurations 114 including a logistics plate (not shown) and/or a splicing plate 116. In some embodiments, the composite panels 112 may be coupled together along a longitudinal axis using rivets, screws, welding adhesives or the like.

Additionally, as shown in FIG. 1, the composite panels 112 may be coupled to a top rail 118 and a bottom rail 120 using a plurality of fasteners 122, e.g., rivets, screws, adhesives, or the like. One or more composite panels 112 may also be coupled to one or more vertically oriented rails 124, 126 that are aligned with and substantially parallel to a longitudinal axis A of the trailer 102 using a fastener 122, e.g., a rivet. The vertical rails 124, 126 may be disposed between the panels 112 at various points along the length of the trailer 102. Other joint configurations and other fasteners, for example, screws, bolts, nails, welding adhesives, and the like, may also be used to couple adjacent composite panels 112 together, composite panels 112 to the top rail 118 and/or the bottom rails 120, and/or the composite panels 112 to the vertical rails 124, 126.

Figure 2:
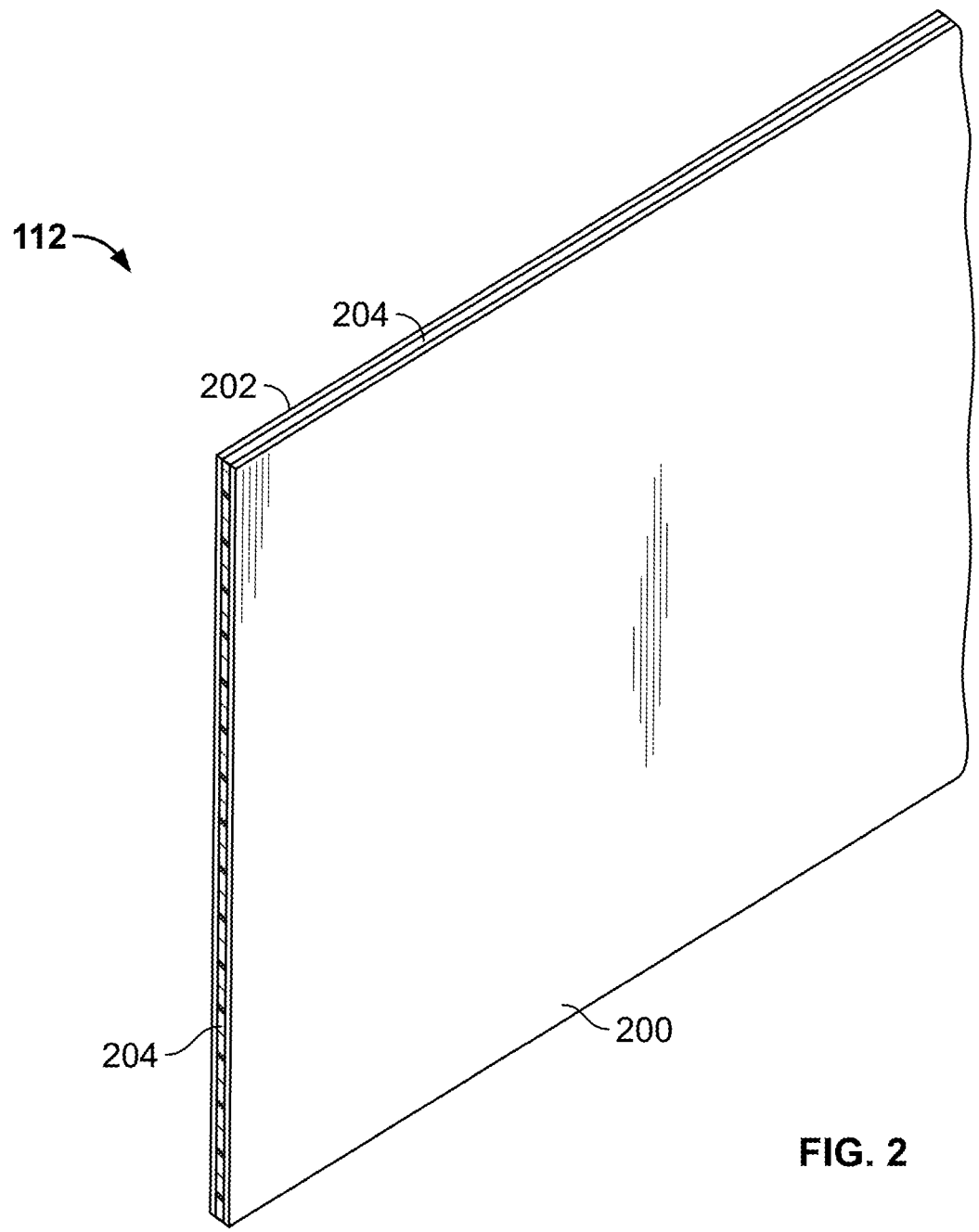
FIG. 2 is an isometric view of one of the composite panels of FIG. 1 having two outer sheets and an inner core member.

FIG. 2 depicts a portion of one composite panel 112 that is provided in the form of an inner sheet 200, an outer sheet 202 positioned opposite of the inner sheet 200, and a core member 204 positioned between the inner sheet 200 and the outer sheet 202. The inner sheet 200 and the outer sheet 202, independently, may be formed from high-strength, high-tension steel plates, aluminum, other metals, and/or other alloys. In further embodiments, the inner sheet 200 and the outer sheet 202, independently, may be formed from a reinforced plastic or polymer, such as a fibre-reinforced plastic and/or a glass-reinforced plastic. The inner sheet 200 and outer sheet 202 may also be formed from other materials including, for example, bioplastics, wood, thermoplastic, polymers, and other materials. Further, the core member 204 may be provided in the form of a thermoplastic material that will be described in more detail below.

The inner sheet 200 and the outer sheet 202 may be bonded to the core member 204 by a suitable adhesive layer (not shown). In one embodiment, the inner sheet 200 and the outer sheet 202 are bonded to the core member 204 by a suitable flexible adhesive bonding film such as, for example, modified polyethylene. It may be understood that other suitable adhesives or joining mechanisms may also be used as well. When fully assembled, the outer sheets 202 of each panel 112 cooperate to form an exterior surface of the sidewalls 106, the front end wall assembly 108, and/or the rear end wall assembly (not shown) of the trailer 102, while the inner sheets 200 of each panel 112 cooperate to form an interior surface of the sidewalls 106, the front end wall assembly 108, and/or the rear end wall assembly (not shown) of the trailer 102.

Figure 3:
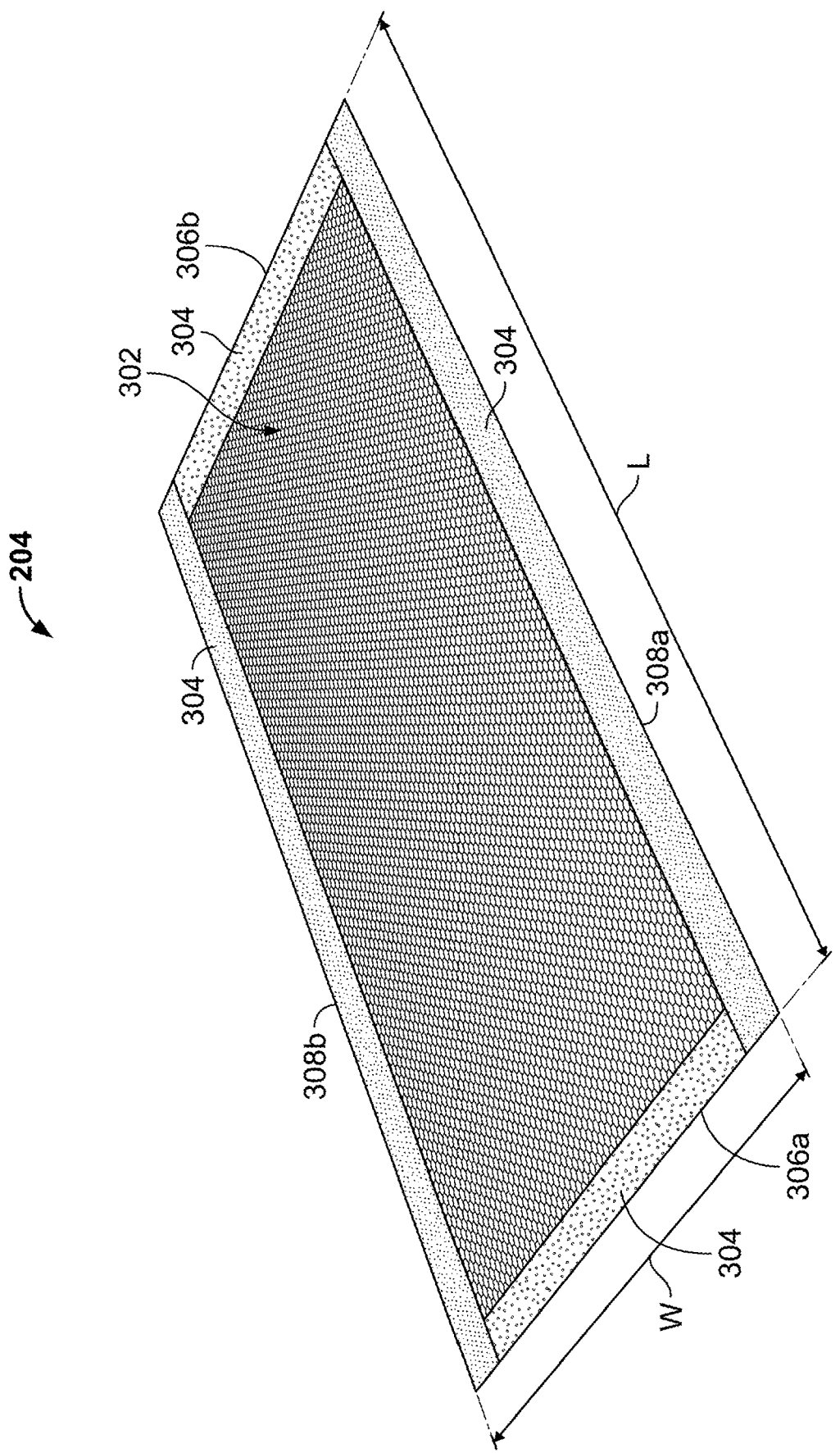
FIG. 3 is an isometric view of the inner core member of the composite panel of FIG. 2 including a primary structure and a reinforced material.
Figure 4:
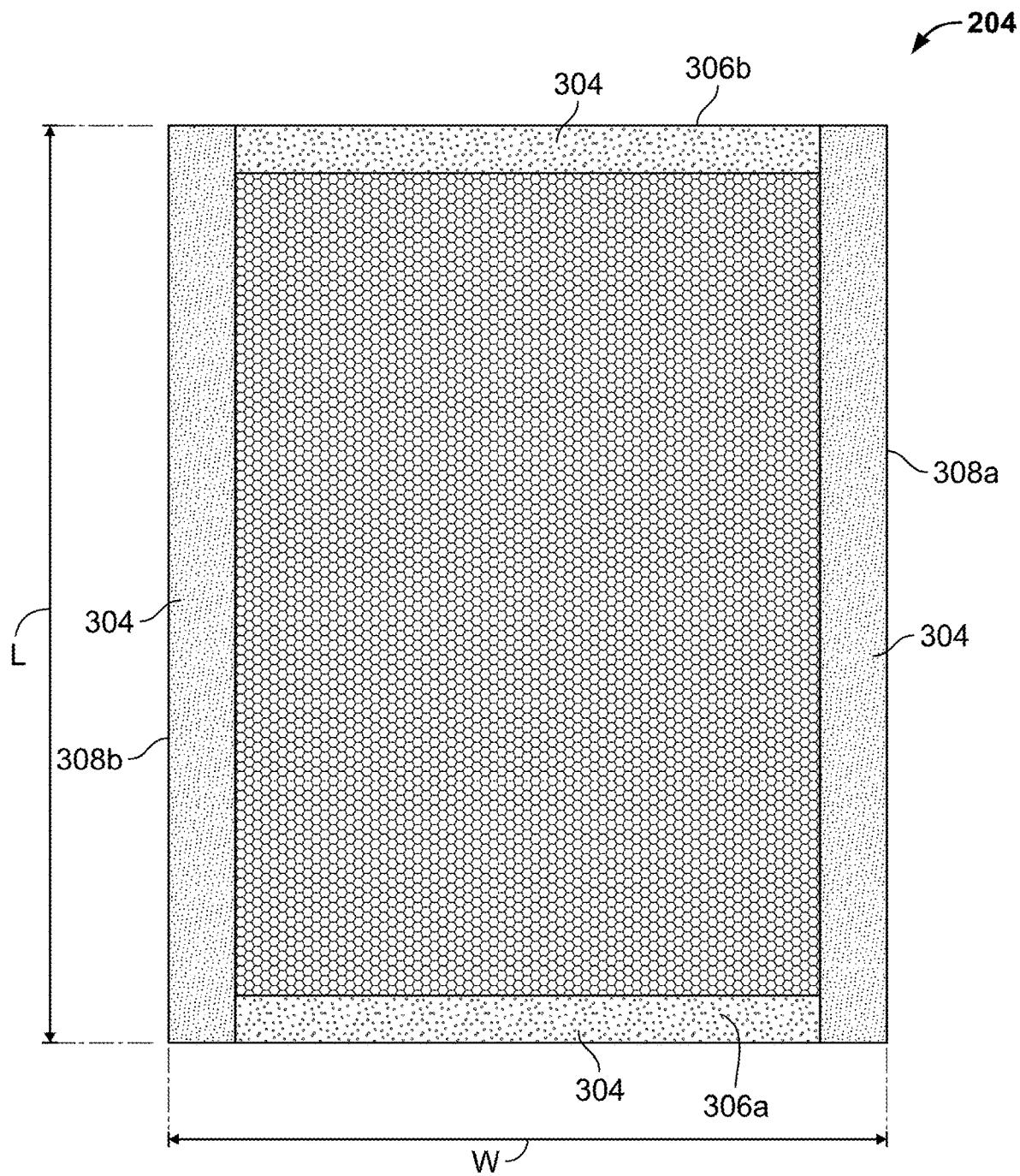
FIG. 4 is a top elevational view of the inner core member of FIG. 3.

FIGS. 3 and 4 depicts the core member 204 of a single composite panel 112, which is substantially rectangular and generally corresponds to the shape and size of each of the inner sheet 200 and outer sheet 202. The core member 204 may include a first section 302 and a reinforced section or second section 304. Further, the core member 204 may be defined by a first end 306a and a second end 306b disposed at opposing ends of the core member 204, and a first lateral edge 308a and a second lateral edge 308b, on opposing sides of the core member 204. Illustratively, the first end 306a and the second end 306b define a length dimension L of the core member 204 and the first and the second lateral edges 308a, 308b define a width dimension W of the core member 204.

The core member 204 may be provided in a variety of shapes and sizes. With reference to FIGS. 3 and 4, the length dimension L and the width dimension W of the core member 204 may generally define the size and shape of the core member 204. In some embodiments, the length dimension L may range between about 1 meter to about 16 meters. In particular embodiments, the length dimension L may range from about 2 meters to about 4 meters, or between about 2.5 meters to about 3 meters. Further, in some embodiments, the width dimension W may range between about 0.5 meters to about 4 meters. In particular embodiments, the width dimension W may range between about 0.75 meters to about 2 meters, or between about 1 meter to about 1.5 meters. The core member 204 may also have a predetermined height or thickness. In some embodiments, the core member 204 has a predetermined thickness between about 3 millimeters to about 15 millimeters and, in particular embodiments, the core member 204 may have a predetermined thickness between about 5 millimeters to about 10 millimeters. It should be understood that the length, width, and thickness dimensions of the core member 204 may be modified such that the core member 204 would be suitable in other applications referenced herein.

As noted above, the core member 204 may also be defined by a first section 302 and one or more second sections 304. The second section 304 may be structurally different with respect to the first section 302 and/or each other. Further, the second section 304 may be materially or compositionally different with respect to the first section 302 and/or to another second section 304.

More specifically, in one embodiment, the first section 302 may comprise a continuous honeycomb thermoplastic cell network, e.g., a honeycomb structure. In a particular embodiment, the continuous honeycomb thermoplastic cell network may include a plurality of hexagonal cells that are substantially hollow. In other embodiments, the first section 302 may include a cell network of polygonal, arcuate, and/or sinusoidal cells that are substantially hollow. Although the first section/first section 302 is typically described as a honeycomb structure throughout, it should be appreciated that the first section 302 may comprise another material that is defined by a lower density than that of the material of the second section 304.

The second section 304 of the core member 204 may be generally defined by a reinforced material. In some embodiments, the reinforced material is a solid or a substantially solid material and, in particular embodiments, is a solid or substantially solid plastic material. In some embodiments, the first section 302 may be surrounded on all sides by the second sections 304. The thickness of the second sections 304 may vary with respect to each other, or may be the same.

The second sections 304 may be disposed around the entire perimeter of the core member 204. In one embodiment, as shown in FIGS. 3 and 4, the second section 304 includes two strips of solid plastic reinforced material located adjacent both the first end 306a and the second end 306b of the core member 204, and two strips of solid plastic reinforced material located adjacent both the first lateral edges 308a and the second lateral edge 308b. The second section 304 may also be defined by a greater volumetric density as compared to the first section 302. Further, the second sections 304 may also be disposed within the core member 204. In fact, the second sections 304 may be placed anywhere within or around the core member 204 where additional support is desired. For example, the second sections 304 may be strategically placed in areas to prevent bolts, rivets, or the like from crushing the core member 204. Alternatively, in other embodiments, the second sections 304 may only be disposed on one edge of the core member 204.

In some embodiments, the first section 302 extends in the width dimension W and/or the length dimension L of the core member 204 almost the entire length and/or width thereof, but terminates adjacent the second sections 304, described in more detail below. In these embodiments, the second sections 304 may define the first end 306a, the second end 306b, the first lateral edge 308a, and/or the second lateral edge 308b of the core member 204.

Further, the second sections 304 may extend a predetermined distance above, below, to the left, and/or to the right of the first section 302. In particular embodiments, the second section 304 may extend above the first section 302 between about 1 centimeter to about 100 centimeters, or between about 1 centimeter to about 50 centimeters, or between about 2 centimeters to about 25 centimeters. The second section 304 may extend below the first section 302 between about 1 centimeter to about 100 centimeters, or between about 1 centimeter to about 50 centimeters, or between about 10 centimeters to about 30 centimeters. Further, the second section 304 may extend to the left of the first section 302 between about 1 centimeter to about 100 centimeters, or between about 1 centimeter to about 50 centimeters, or between about 3 centimeters to about 15 centimeters. The second section 304 may extend to the right of the first section 302 between about 1 centimeter to about 100 centimeters, or between about 1 centimeter to about 50 centimeters, or between about 3 centimeters to about 15 centimeters.

In some embodiments, the first section 302 (i.e., the honeycomb structure) comprises over about 50%, over about 60%, over about 70%, over about 80%, or over about 90% of the entire volume of the core member 204. The first section 302 may be designed to reduce the weight of the core member 204, as compared to a core member having a completely solid core structure, while maintaining desired core strength. Further, the first section 302 may use less plastic as compared to a solid plastic core material. It should be understood that the honeycomb cell network may be formed from other hollow webbed structures (including, for example, squares, parallelograms, triangles, and the like) and is not be limited to hexagonal honeycomb structures. In other embodiments, the first section 302 of the core member 204 may comprise other materials that are at least partially perforated, mesh, embossed, or any other type of material that could be thermally welded or tie layer bonded to the inner sheet 200 and/or the outer sheet 202.

As noted above, the core member 204 may have one or more reinforced plastic materials, i.e., second sections 304, which may be welded or otherwise secured to the first section 302 at outer edges or within interior areas thereof. The second section 304 may be designed and strategically located to be coupled to the top rail 118 and/or the bottom rail 120 of the trailer 102 by a suitable joining member or fastener 122, such as the aforementioned bolts or rivets, for example. In particular, the addition of one or more solid reinforced materials or second sections 304 into the core member may significantly increase the strength of the composite panel 112 in certain desired locations, e.g., a location of fastening. Additionally, the solid reinforced material or second sections 304 may increase the fastener pull out strength when compared to composites that comprise complete honeycomb material cores. In effect, the second sections 304 may be positioned so that when the composite panel 112 is attached to the top rail 118, for example, the fastener 122 extends through the second section 304 of the core member 204, as opposed to extending through the first section 302.

The first section 302 and the second section 304 of the core member 204 may be formed from a thermoplastic, such as a high density polyethylene, i.e., HPDE, or a high density polypropylene. However, the first section 302 and second section 304 may be formed from other suitable materials. For example, the first section 302 and the second section 304 may each, individually, be formed from a low density polyethylene, i.e., LDPE, a polyethylene terephthalate, i.e., PET, a polypropylene, i.e., PP, or the like. Although the materials of the first section 302 and the second section 304 of the core member 204 may comprise the same material, the process and methodology to form the first section 302 and the second section 304 of the core member 204 may be different with respect to each other and is described in more detail below. As a result, the first section 302 and the second section 304 of the core member 204 may be defined by different properties including, for example, density, tensile strength, and the like.

Figure 5:
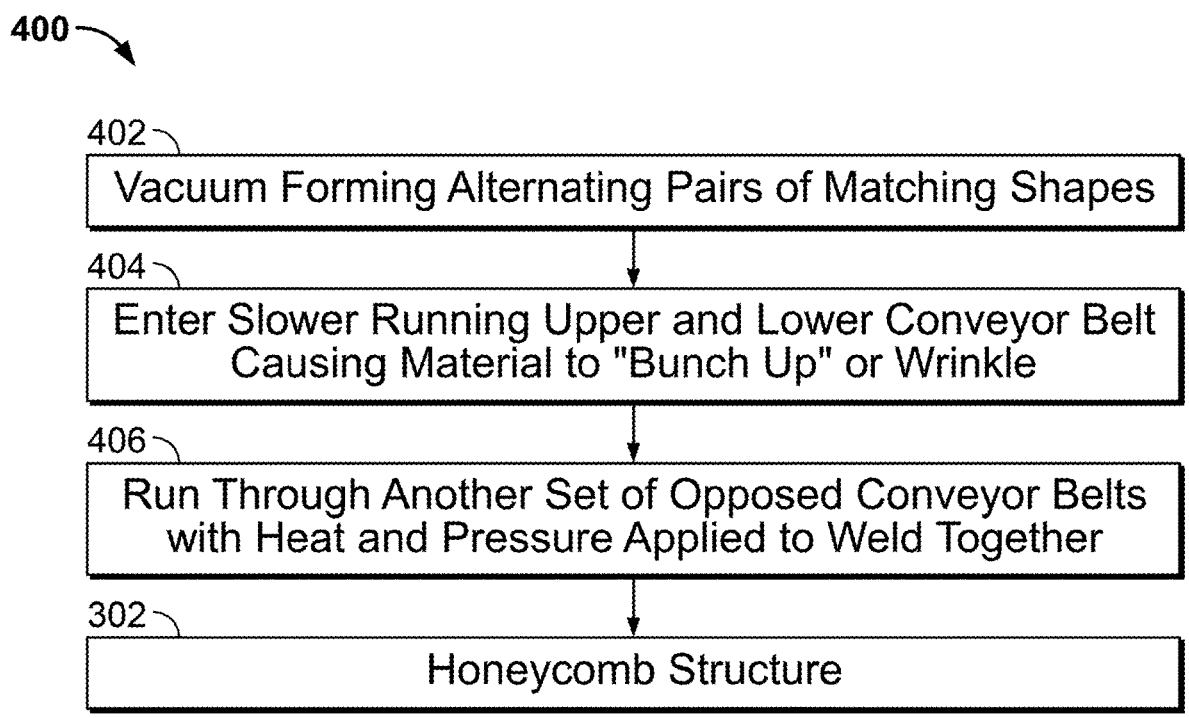
FIG. 5 is a flow chart for an example methodology used to make the continuous honeycomb structure of FIG. 3.
Figure 6:
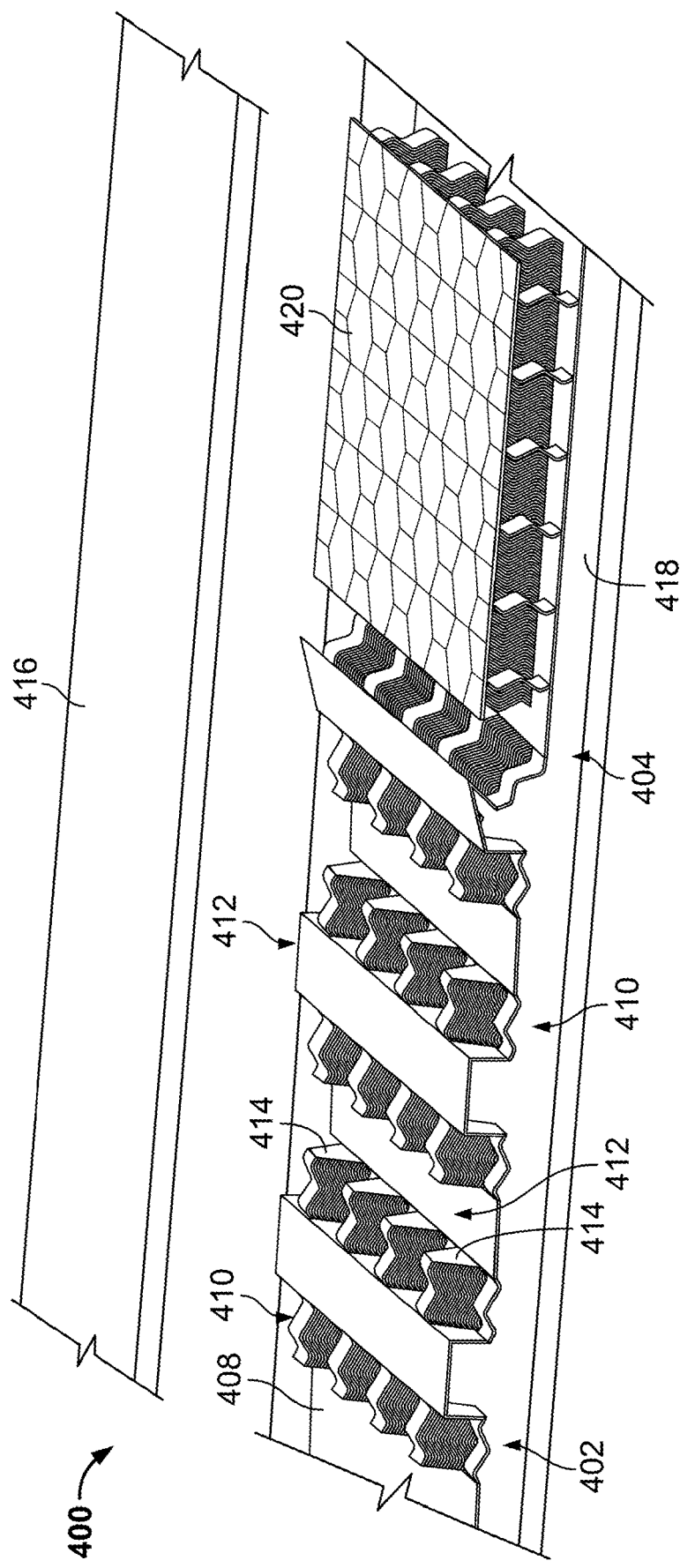
FIG. 6 is an isometric view of a portion of a plurality of panels on a production line undergoing the method of FIG. 5.

FIGS. 5 and 6 depict an illustrative process or method 400 for making the first section 302 of the core member 204. Exemplary processes or methods for making a honeycomb structure are described in detail in International Publication No. WO 2008/141688 A2, the entirety of which is hereby incorporated by reference herein. Generally, the process 400 is schematically illustrated with steps 402, 404, and 406. In most embodiments, a flat sheet 408 of thin deformable material may be fed to the process 400 as a starting material. For example, the flat sheet 408 may be one of a thermoplastic polymer, a low density polyethylene, a polyethylene terephthalate, a polypropylene, a fiber composite, a plastically deformable paper, a deformable metal sheet, or the like.

Initially, step 402 comprises the step of vacuum forming the thin sheet 408 into alternating pairs of matching shapes. In particular embodiments, the sheet 408 may be intermittingly vacuum formed to produce a plurality of deformed regions 410 and a plurality of non-deformed regions 412 positioned therebetween. The deformed regions 410 are generally three-dimensional and include one or more individual cells 414 of predetermined shape and size. As will be described in greater detail below, the predetermined shape and size of the cells 414 determine the structure of the first section 302 of the core member 204. For example, in a particular embodiment shown in FIG. 5, the cells 414 are substantially trapezoidal to produce, when folded, a honeycomb structure. Alternative embodiments may include a cell with a polygonal structure, a sinusoidal or arcuate shape, a rectangular design, or the like. Further, the walls of the cells 414 may be substantially linear, bowed, curved, etc. to produce the first section 302 with a desired structure.

In the next step 404, the vacuum formed mating pairs or cells 414 enter onto a conveyor belt. In some embodiments, the conveyor belt includes an upper conveyor belt 416 and a lower conveyor belt 418 that are running at a speed that is relatively slower than a speed of the incoming material. The slower speed of the lower conveyor belt 418 may cause the incoming vacuum formed mating pairs or cells 414 to bunch up, wrinkle, and/or stand up to produce a plastic network 420, e.g., a plastic honeycomb network. For example, in the embodiment shown in FIG. 5, the material may be formed into alternating pairs of trapezoidal cells that, when folded, form completed hexagonal shapes.

Finally, in step 406, the bunched up honeycomb structure or plastic network 420 enter a second conveyor belt (not shown). In particular embodiments, the second conveyor belt may be provided as opposed conveyor belts, i.e., one conveyor positioned above the plastic network 420 and one conveyor positioned below the plastic network 420. Further, the conveyor belts may apply a predetermined amount of heat at a predetermined temperature and/or a predetermined amount of force may be applied at a predetermined pressure to consolidate and/or weld the plastic network 420 together to produce the first section 302. Additional heat and/or pressure may be applied in step 406 to calibrate the first section 302 to the desired final thickness and/or the desired final height.

The predetermined temperature applied in step 406 may range between about 40° C. to about 250° C. In some embodiments, the predetermined temperature may range between about 100° C. to 200° C. or between about 160° C. to about 190° C. Further, the predetermined pressure may range from about 1 MPa to about 100 MPa. In particular embodiments, the predetermined pressure may range between about 15 MPa to about 40 MPa, or between about 25 MPa to about 30 MPa. The heat and/or pressure may be applied for a predetermined amount of time in order to consolidate and/or weld the plastic network 420 together and/or weld the first section 302 to the second section 304. Further, the heat and/or pressure may be applied for a predetermined amount of time in order to calibrate the first section 302 to a desired thickness.

In some embodiments, the method 400 may be altered to produce a core member 204 comprising the first section 302 and the second section 304. In one embodiment, the vacuum forming process occurring in step 402 of the process 400 may be intermittently turned off or interrupted. As a result, after the vacuum forming step 402 of the process 400 is interrupted and, consequently, after the cells 414 bunch up in step 404 of the process 400, a gap (not shown) of thin plastic material may be produced. Then the reinforced material or second section 304 may be inserted into the aforementioned gap.

Further, the vacuum forming process or the method 400 may intermittently speed up. In one embodiment, the vacuum forming process or the method 400 may be sped up to cause the material in step 404 to bunch up, wrinkle, and/or stand up at a faster pace than when the process 400 is operated at a normal operating speed, which results in the cells 414 and/or a portion of the plastic network 420 to collapse. In other words, a portion of the plastic network 420 may collapse, thereby causing the material to pack more tightly together to form a solid reinforced section that is substantially similar in structure and function to the second sections 304.

In a further embodiment, a section of the first section 302 may be run through a heated platen press or similar process to compress various sections of the first section 302 to create bands of compressed material, i.e., gaps, into which the reinforced material or second section 304 may be inserted therein.

Figure 7:
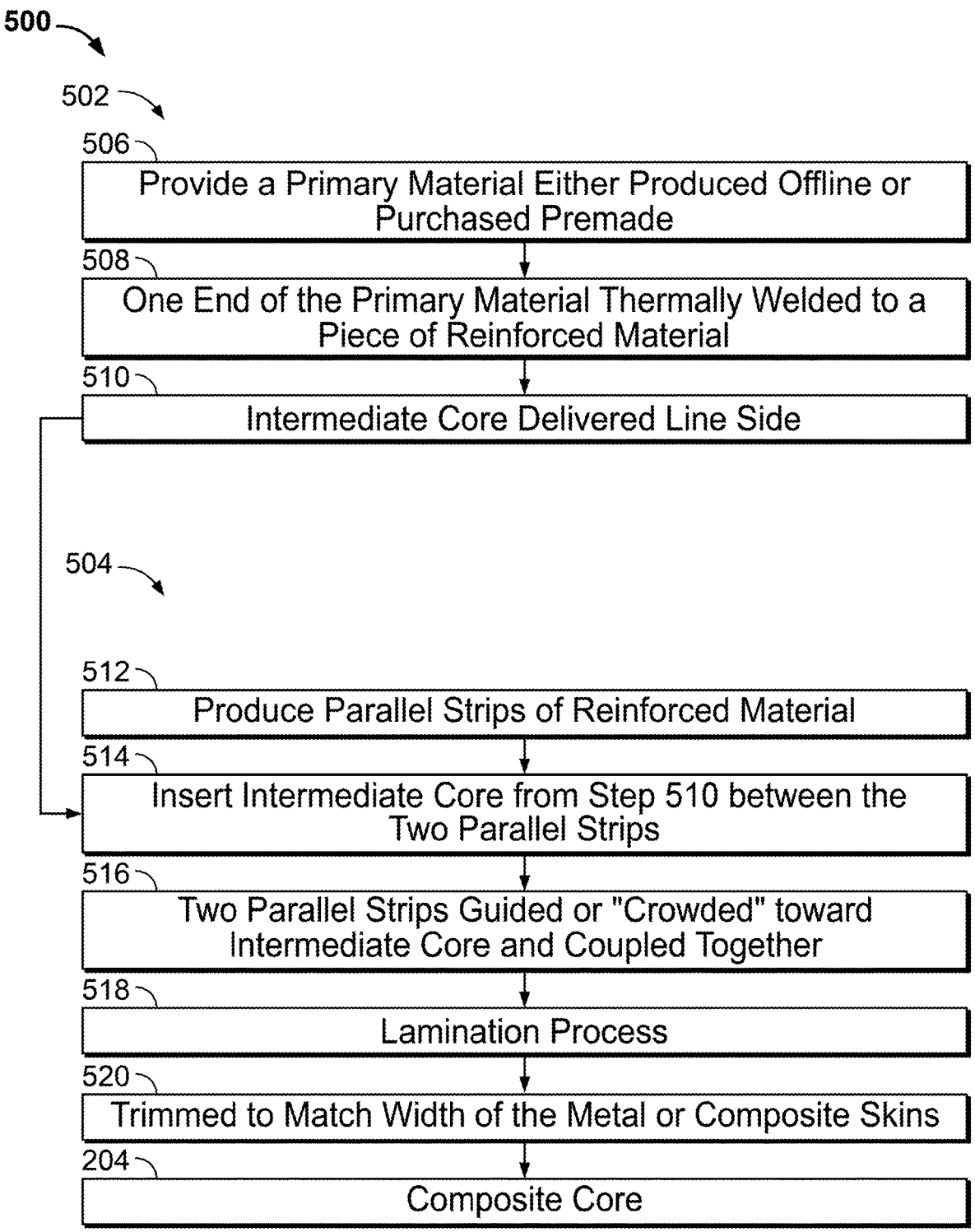
FIG. 7 depicts an illustrative process or method for making the inner core member of FIGS. 3 and 4.

FIG. 7 depicts one method 500 for constructing the core member 204. The method or process 500 may be a continuous process, whereby the composite panels 112 may be produced continuously. Alternatively, the method 500 may be undertaken on a standalone production line, whereby discrete sheets or composite panels 112 may be formed in a batch manner or on a one to one basis.

In the embodiment shown in FIG. 7, the method 500 has two starting materials with a first production line 502 and a second production line 504. Further, the first production line includes steps 506, 508, and 510, and the second production line includes steps 512, 514, 516, 518, and 520. Initially, the first section 302 of the core member 204 may provided to the first production line 502 in the step 506. In the present embodiment, the first section 302 may be produced off line or purchased premade and may be provided in a predetermined size. In other embodiments, the first section 302 may be made in a production line onsite. In particular, the first section 302 may be provided by the method 400 and may be about 107 cm wide, about 244 cm long, and about 1.1 cm thick. In this process, the first section 302 of the core member 204 may be provided as a honeycomb material, perforated, mesh, embossed, or any type of core that could be thermally welded or tie layer bonded to the inner sheet 200 and/or outer sheet 202.

In step 508, the first section 302 of the core member 204 may be attached to the reinforced material or second section 304 along the first end 306a. Further, second sections 304 may also be attached to the first section 302 of the core member 204. The second sections 304 attached to the core member 204 may be provided as a strip of foamed thermoplastic (HDPE or PP) having dimensions of about 107 cm wide, 36 cm long, and about 1 cm thick.

Figure 8:
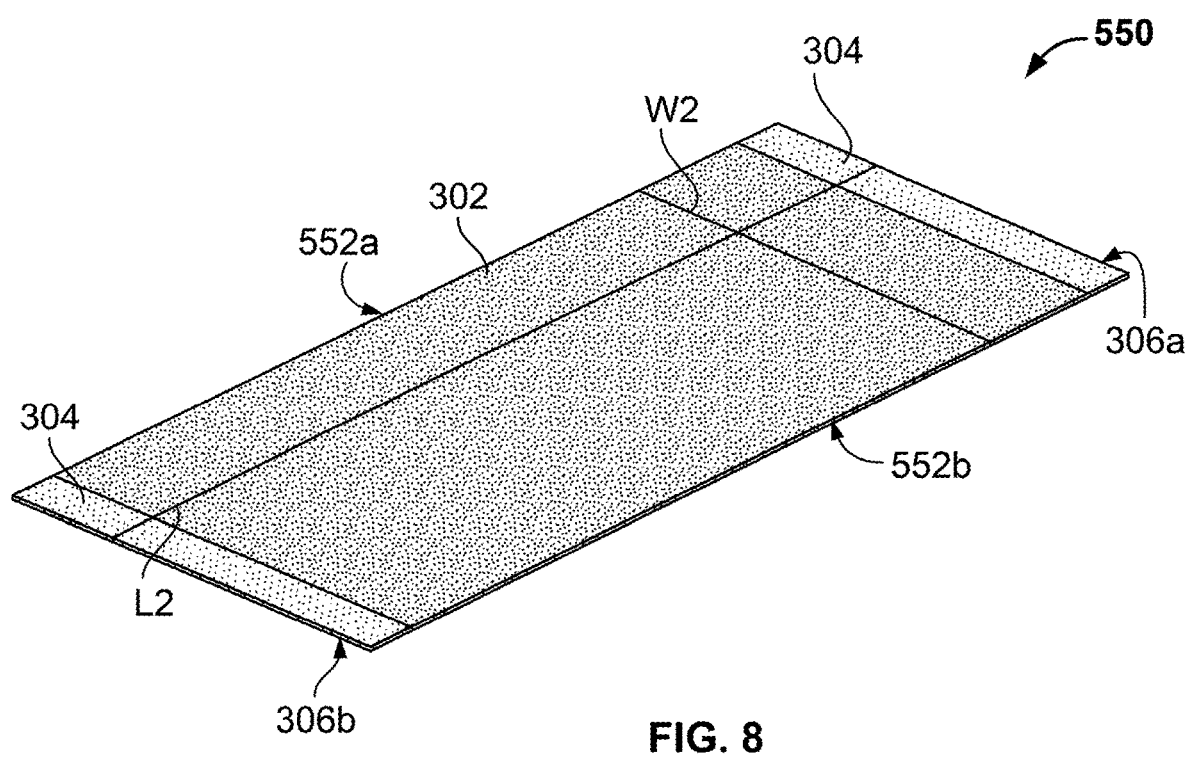
FIG. 8 is an isometric view of an intermediate core that is produced during the method of FIG. 7.

In some embodiments, the first section 302 of the core member 204 may be attached to the second section 304 via a form of thermal welding using infrared, hot air, or other suitable technology. The end result of step 508, as shown in FIG. 8, may be an intermediate core 550 with a unitary structure that comprises the first section 302 of the core member 204 being attached to the second section 304 along the first end 306a and the second end 306b. In alternative embodiments, the intermediate core 550 may include the second section attached only to the first end 306a or only attached to the second end 306b.

The intermediate core 550 may be substantially rectangular and may be defined by the first end 306a and the second end 306b disposed at opposing ends of the intermediate core 550, and a first lateral edge 552a and a second lateral edge 552b, on opposing sides of the core member 204. Illustratively, the first end 306a and the second end 306b define a length dimension L2 of the intermediate core 550, and the first lateral edge 552a and the second lateral edge 552b define a width dimension W2 of the intermediate core 550.

The intermediate core 550 may be provided in a variety of shapes and sizes. With reference to FIG. 8, the length dimension L2 and the width dimension W2 of the intermediate core 550 may generally define the size and shape of the intermediate core 550. In some embodiments, the length dimension L2 may range between about 1 meter to about 16 meters. In particular embodiments, the length dimension L2 may range from about 2 meters to about 4 meters, or between about 2.5 meters to about 3 meters.

Further, in some embodiments, the width dimension W2 may range between about 0.5 meters to about 4 meters. In particular embodiments, the width dimension W2 may range between about 0.75 meters to about 2 meters, or between about 1 meter to about 1.5 meters. The intermediate core 550 may also have a predetermined height or thickness. In some embodiments, the intermediate core 550 has a predetermined thickness between about 3 millimeters to about 15 millimeters and, in particular embodiments, the intermediate core 550 may have a predetermined thickness between about 5 millimeters to about 10 millimeters. It should be understood that the length, width, and thickness dimensions of the intermediate core 550 may be modified such that the intermediate core 550 would be suitable in other applications referenced herein.

Following step 508, the intermediate core 550 may be delivered line side to the second production line 504 in step 510. In step 512, the second production line 504 may include an extrusion line that produces two continuous parallel strips of the reinforced material or second sections 304 that are separated by a predetermined width. For example, in one embodiment, each strip of the second section 304 may be provided having a width dimension of between about 12 cm to about 17 cm, with a gap created between the parallel strips of about 107 cm to about 117 cm. In particular embodiments, the second sections 304 produced by step 512 may be separated by a predetermined width relatively equal to the width W2.

In step 514, stacks of the intermediate cores produced from step 510 may be delivered lineside to the second production line 504 and may be automatically inserted between the continuous parallel strips of the second sections 304 of step 512. The intermediate cores 505 may be inserted one-behind-the-other or in a head-to-tail fashion, such that there is no gap between the inserted intermediate cores 550. In step 516, the two continuous parallel strips of the second sections 304 may be guided toward and coupled to the intermediate core 550 using heat applications including, but not limited to, infrared or hot air systems. The intermediate core 550 and the second sections 304 may also be coupled using other joining techniques or applications including, for example, adhesives. The result of step 516 may be a continuous ribbon of core members 204 having the second sections 304 along opposing sides and at spaced intervals in the transverse direction with respect to the longitudinal axis of the core members 204.

Leaving step 516, the continuous ribbon of core members 204 enter step 518, which includes a lamination process that is designed to increase the strength and durability of the core members 204. Further, the core members 204 may be cut and/or trimmed to a desired size in step 520. Therefore, the result of step 520 may be a core member 204 having the length L and the width W. In particular embodiments, the length L may be about 280 cm and the width W may be about 125 cm. Additionally, the core member 204 may include about 10 cm to about 20 cm of the second section 304 on a top end thereof for top rail fastening and from about 15 cm to about 25 cm of the second section 304 on a bottom end thereof for bottom rail fastening. Further, approximately 7 cm to about 10 cm of second section 304 may be provided on opposing edges 308a, 308b for seam fastening.

Figure 9:
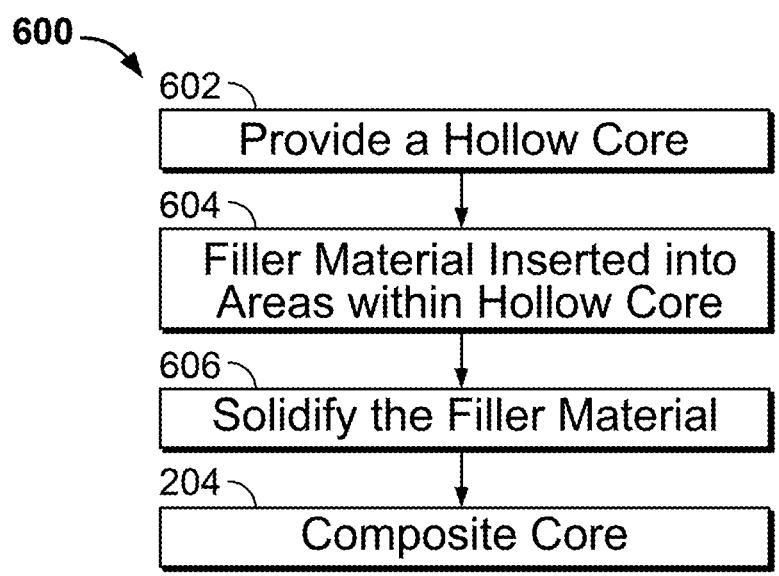
FIG. 9 depicts an alternative process or method for making the inner core member of FIGS. 3 and 4.

FIG. 9 depicts an alternative process or method 600 for making the core member 204. The first section 302 of the core member 204 may first be provided to the production line in step 602. As discussed above, the first section 302 of the core member 204 may be produced off line, purchased pre-made, and/or produced on site with a predetermined size. The first section 302 of the core member 204 in the present embodiment may include a hollow structure that is the same or similar to the honeycomb core described previously. In some embodiments, the first section 302 may also include portions that are mesh, perforated, or embossed.

Leaving step 602 and in step 604, a filler material 608 (see FIG. 10) may be inserted into areas within the core member 204 using a dispensing device 610. In one embodiment, the filler material 608 may be a plastic resin that solidifies during a lamination process. However, the filler material 608 may also be any suitable material that may be inserted into one or more predefined areas of the core member 204 to increase the material strength of the structure.

Figure 10:
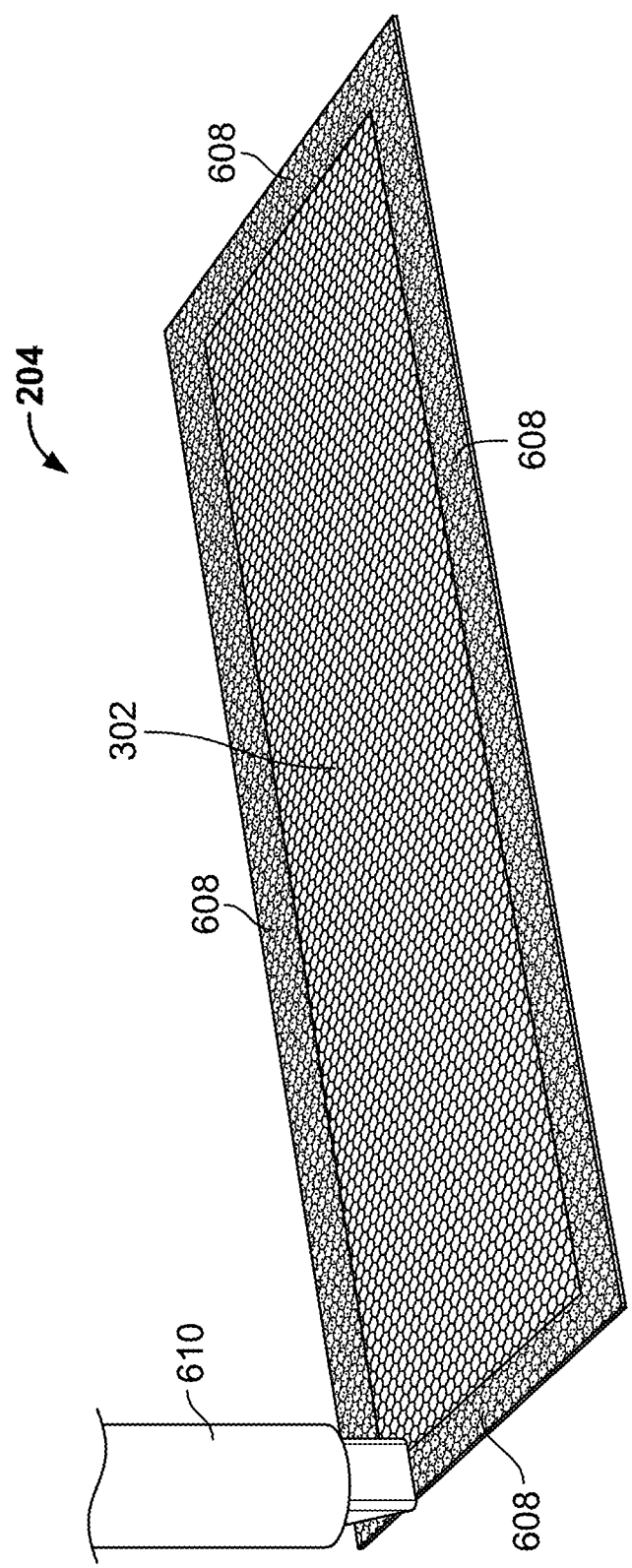
FIG. 10 is an isometric view of an inner core member being filled with a reinforcing material along a plurality of exterior edges according to the process of FIG. 9.

FIG. 10 is a schematic representation of step 604, with the filler material 608 being inserted around the perimeter of the core member 204 using the dispensing device 610. In alternative embodiments, the filler material 608 may be inserted into a variety of locations within the core member 204. Particularly, the dispensing device 610 may be mounted on an X-Y axis to allow the dispensing device 610 to dispense the filler material 608 to any desired location within the core member 204 and, therefore, should not be limited to the perimeter of the core member 204. Further, in another embodiment, a plurality of dispensing devices may be used to insert the filler material 608.

In particular embodiments, the filler material 608 may be provided as a carbon dioxide filled plastic resin. In step 606, the filler material 608 may solidify (during a lamination process or otherwise) to produce areas within the core member 204 that include the filler material 608. In the embodiment wherein the filler material 608 is the aforementioned carbon dioxide filled plastic resin, the carbon dioxide filled plastic resin may expand to completely fill, or substantially completely fill, the hollow structures within the core member 204. The result of step 606 may be the core member 204 having a plurality of sections that are reinforced with the filler material 608. In this embodiment, the filler material 608 may circumscribe the entirety of the core member 204 such that the filler material 608 is continuous along each edge of the core member 204.

As previously mentioned, the second sections 304 may be strategically placed anywhere within or around the core member 204 where support may be desired. Therefore, the dispensing device 610 may also be used to place the filler material 608 along only one edge of the core member 204 or any area within the core member 204.

Figure 11:
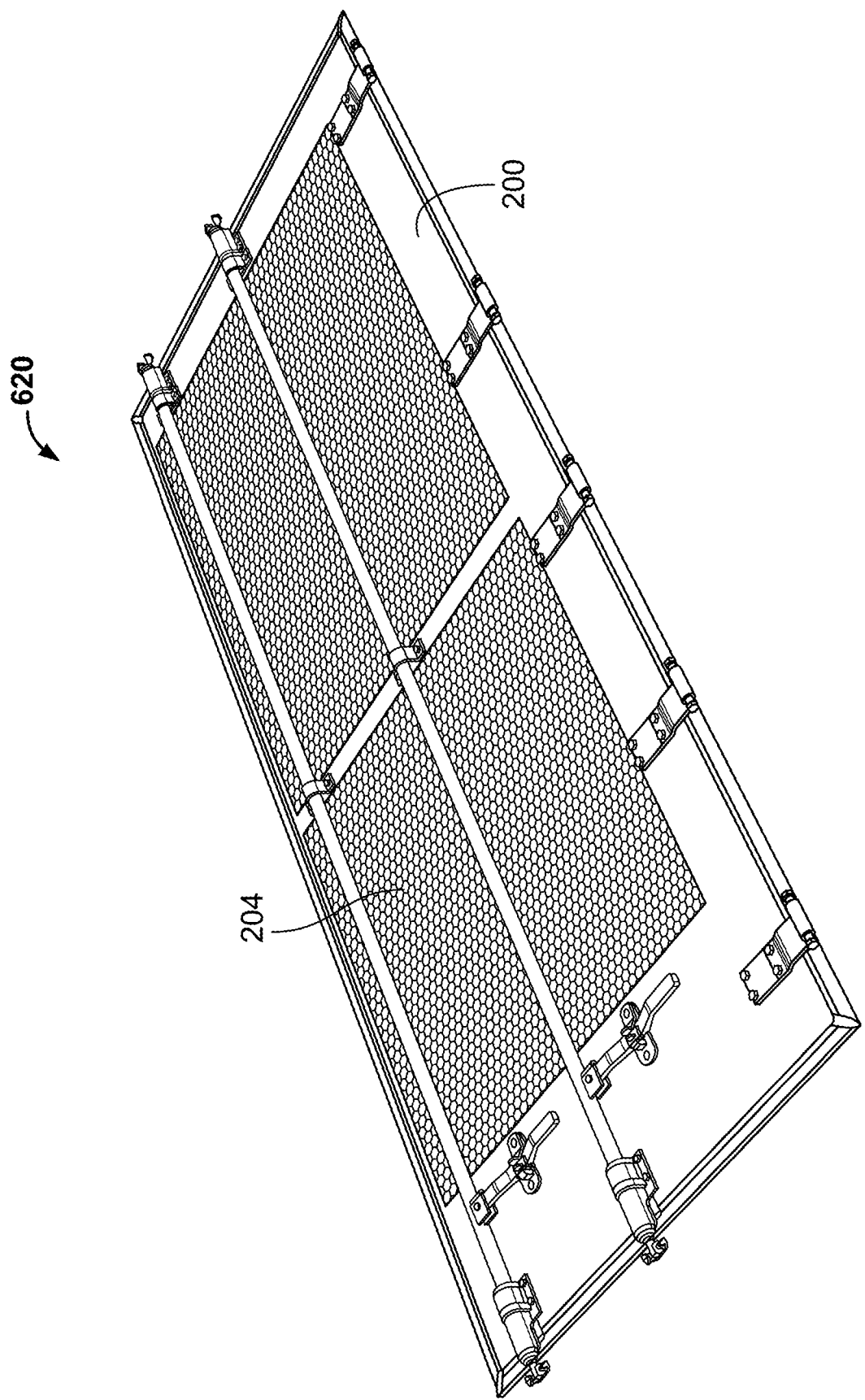
FIG. 11 is an isometric view of a trailer door including a composite panel made according to one of the processes described herein.

FIG. 11 depicts one application of the core member 204 produced in any of the methods described herein. More specifically, in FIG. 11, the core member 204 is provided within a rear door 620 of the trailer 102 and at least portions of the inner sheet 200 and the outer sheet 202 may be provided on opposing sides of the core member 204. The core member 204 may be provided with a plurality of discrete or continuous areas that are reinforced according to the methods described herein. The reinforced areas of the core member 204 may correspond to the areas in which various door components are attached to the core member 204. For example, reinforced areas or second sections 304 may be provided at opposing ends of the door 620 and/or along the exterior edges of the door 620 where hinges, lock rod fastening, and/or other components are joined to the door 620. The reinforced material or second sections 304 may be provided in the core member 204 to help provide additional fastening strength, additional compression strength, increased puncture and impact resistance, and/or other structural requirements.

Although the composite panel 112 and the core member 204 discussed herein have been discussed with respect to a tractor trailer application, it should be appreciated that the composite panel 112, core member 204, and/or any associated parts may be used in other applications such as, for example, other automotive and transportation applications, furniture applications, architecture applications and building materials, packing materials and logistics applications, aerospace applications, and the like.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

I claim:

1. A method of producing a composite core member along a production line, the core member being used within a composite panel of a tractor trailer, the method comprising:
   providing an intermediate core member comprising a reinforced material positioned on at least one end of the intermediate core member;
   extruding at least two strips of reinforced material such that each extruded strip of reinforced material has a width sized to receive a fastener therethrough;
   inserting the intermediate core member between the extruded strips of reinforced material; and
   coupling the strips of reinforced material to a first side and a second side of the intermediate core member to form the core member.

2. The method of claim 1, wherein the method further comprises a step of providing at least one of a partially hollow honeycomb structure, a perforated structure, a mesh structure, or an embossed structure as the intermediate core member.

3. The method of claim 1, wherein the method further comprises a step of laminating the core member after the coupling step.

4. The method of claim 1, wherein the method further comprises a step of cutting the composite core member to a predetermined length and a predetermined width.

5. The method of claim 4, wherein the predetermined length is between about 2 meters to about 4 meters and the predetermined width is between about 0.75 meters to about 2 meters.

6. The method of claim 1, wherein the method further comprises the steps of fastening a first sheet to a front face of the core member and fastening a second sheet to a rear face of the core member.

7. The method of claim 2, wherein the step of providing the intermediate core member is performed on a first production line and the step of producing the at least two strips of reinforced material is performed on a second production line separate from the first production line.

8. The method of claim 1, wherein the method further comprises a step of guiding the at least two strips of reinforced material toward the intermediate core member.

9. The method of claim 1, wherein the at least two strips of reinforced material are extruded with a predetermined gap therebetween.

10. The method of claim 1, wherein the step of coupling the at least two strips of reinforced material to the first side and the second side of the intermediate core member comprises thermally welding one of the at least two strips of reinforced material to the first side and the other of the at least two strips to the second side of the intermediate core member.

11. The method of claim 1, wherein the reinforced material is positioned on both ends of the intermediate core member so that, after coupling the strips of reinforced material to the intermediate core member, the reinforced material is disposed around an entire perimeter of the core member.

12. A method of producing a composite panel of a trailer, the method comprising:
    providing an intermediate core member comprising a reinforced material positioned on at least one end of the intermediate core member;
    producing two parallel strips of reinforced material, wherein each of the two parallel strips has a width sized to receive a fastener therethrough;
    inserting the intermediate core member between the two parallel strips of reinforced material;
    guiding the two strips of reinforced material toward the intermediate core member;
    coupling the strips of reinforced material to a first side and a second side of the intermediate core member to form the core member; and
    coupling an inner sheet and an outer sheet onto a first face and a second face, respectively, of the core member to form the composite panel.

13. The method of claim 12, wherein the method further comprises a step of providing at least one of a partially hollow honeycomb structure, a perforated structure, a mesh structure, or an embossed structure as the intermediate core member.

14. The method of claim 12 and further comprising coupling the composite panel to a rail of the trailer.

15. The method of claim 12 and further comprising coupling the composite panel to a portion of the trailer along the reinforced material using a fastener through the width of the reinforced material.

16. The method of claim 12, wherein producing the two parallel strips of reinforced material includes extruding the two parallel strips of reinforced material with a gap therebetween.

17. The method of claim 12, wherein providing the intermediate core member includes providing a plurality of intermediate core members; and wherein inserting the intermediate core member includes inserting the plurality of intermediate core members one behind another.

18. The method of claim 12, wherein providing the intermediate core member comprising the reinforced material positioned on the at least one end of the intermediate core member includes providing the intermediate core member comprising the reinforced material positioned on both ends of the intermediate core member.

19. The method of claim 12, wherein coupling the strips of reinforced material to the first side and the second side of the intermediate core member to form the core member comprises thermally welding one of the two strips of reinforced material to the first side and the other of the two strips to the second side of the intermediate core member.

20. The method of claim 12, wherein coupling the strips of reinforced material to the first side and the second side of the intermediate core member to form the core member comprises coupling one of the two strips of reinforced material to the first side and the other of the two strips to the second side using an adhesive.

\* \* \* \* \*